United States Patent [19]
Martin et al.

[11] 3,849,300
[45] Nov. 19, 1974

[54] METHOD FOR THE SEPARATION OF SATURATED FROM UNSATURATED COMPOUNDS

[75] Inventors: Theodore T. Martin; Marvin C. Allen, both of Ponca City, Okla.

[73] Assignee: Continental Oil Company, Ponca City, Okla.

[22] Filed: July 25, 1973

[21] Appl. No.: 382,627

[52] U.S. Cl............. 208/310, 23/230 R, 23/230 C, 55/74, 210/31 C, 260/676 AD
[51] Int. Cl............................................... C07c 7/12
[58] Field of Search ....... 208/310; 210/31 C; 55/74, 55/75; 260/676 AD

[56] References Cited
UNITED STATES PATENTS
3,063,218   11/1962   Pernert et al. .......................... 55/74

*Primary Examiner*—Herbert Levine
*Attorney, Agent, or Firm*—Ronnie D. Wilson

[57] ABSTRACT

An improved method for the class separation of saturated from unsaturated compounds present in a mixture via an adsorption process wherein the improvement comprises saturating the adsorbed mixture with halogen vapor.

8 Claims, No Drawings

METHOD FOR THE SEPARATION OF SATURATED FROM UNSATURATED COMPOUNDS

The present invention relates to an improved method for the class separation of saturated from unsaturated compounds present in a mixture. More particularly, it relates to an improved method for separating high molecular weight saturates from high molecular weight unsaturates via an adsorption process which utilizes halogen vapor to acheive said separation.

It is well known that existing separation techniques, such as thin-layer chromatography and column chromatography, are capable of separating nonaromatic hydrocarbons from all but the longest chain alkyl benzenes. The present invention fills this gap in the present technology and is applicable to both nonhydrocarbon and hydrocarbon mixtures. The present invention solves the separation problems associated with the fact that the polarities of high molecular weight saturates and unsaturates, such as alkanes and alkenes, become very similar with increasing molecular weights. The present invention provides a method for the separation of these types of compounds which was heretofore unkown.

The improved method of the present invention provides a quick, simple method of general utility as compared to previous techniques in this general area of technology.

Therefore, it is an object of the present invention to provide the art with an improved method for separating unsaturated compounds via an adsorption process utilizing halogen vapor to achieve said separation.

More specifically, the object of the present invention is to achieve separation of compounds of similar polarity via adsorption techniques for the subsequent quantitative analysis thereof.

A further object of the invention is to provide an effective, simple, and economic method whereby using adsorption techniques and halogen vapor effective separation of high molecular weight olefins and paraffins may be achieved.

Further objects and advantages of the present invention will become apparent from a further reading of the following description and the appended claims.

It is now been found that the objects of the present invention can be attained, in a method for separating saturated from unsaturated compounds present in a mixture via adsorbing said mixture on an adsorbent and eluting with a solvent for the subsequent quantitative analysis thereof, by saturating an adsorbed mixture with halogen vapor.

In the operation of the improved method of the present invention, the temperature must be sufficient to vaporize the halogen utilized. The halogen vapor should be in contact with the adsorbed mixture long enough to achieve full saturation thereof. Of course, the exact time of contacting will vary depending on the thickness of the layer, size of the layer, amount of halogen vapor employed, and the amount of unsaturate present in the sample.

Suitable adsorbents for use herein include silica gel, alumina, and fluorosil or the like, with silica gel being preferred.

Any of the halogens in vapor phase will effect the separation of the present invention, however, bromine and iodine are preferred. It is believed that the halogen acts as a catalyst for the reaction between the classes of compounds in the mixture and the adsorbent.

As a choice of solvents for utilization in the present invention, any of the conventional solvents used in adsorption-separation techniques are suitable. The choice of solvents depends on the mixture itself. When applying the present invention to thin-layer chromatography (TLC) techniques, one should use the solvent which will acheive the best resolution of the components of a given sample. However, it is preferred to use the least polar solvent which will achieve good resolution. The more polar samples are considered the more difficult to move on a layer.

In the use of solvents in the present invention, when applied to TLC, the usual developing solvents may be employed prior to halogen vapor saturation; whereas, subsequent to said saturation, a relatively nonpolar solvent is suitable, with hexane being preferred. Other suitable solvents include heptane, octane, cyclohexane, and the like.

The mixtures which are separable by the process of the present invention are those containing both saturated and unsaturated compounds. The process is applicable to the separation of mixtures of compounds containing $C=C$, $C=O$, $O-H$ or similar bonds. It is particularly suitable for the separation of mixtures containing olefins and paraffins.

In a particularly preferred embodiment, the invention is applied to mixtures containing olefins and paraffins. The present invention is applicable to both low and high molecular weight compounds, however, it is particularly advantageous to use same with compounds containing 12 (twelve) carbon atoms or more. Since, as stated previously, separation of these type of compounds was heretofore unknown; whereas, in regard to the lower molecular weight compounds known techniques can achieve separation but they lack the speed, simplicity, and excellent economics of the present invention. The process of the present invention is not limited by the molecular weight of the sample mixtures, but the subsequent related techniques of recovery, visualization, and quantitation may be limited by same.

It has been found that when using the present invention for the separation of alkenes from alkanes as well as from other compound classes by TLC techniques, it is necessary to elute the nonaromatic hydrocarbons away from the more polar sample components, expose the dried chromatogram to halogen vapor, and re-elute the alkanes away from the immobilized class of alkenes. The alkene-free alkanes may then by recovered for the determination of open-chain to cyclic alkane ratio by mass spectrometry or left on the layer for direct thin-layer chromatography quantitation as a class. In either case, the immobilized alkenes as well as the more polar compound classes are amenable to direct quantitation by existing thin-layer chromatography methodology.

In the operation of the present invention, regardless of which analysis technique to which it is applied, it is necessary that the sample mixture be thoroughly exposed to the contact surfaces of an adsorbent. Further, if a solvent is utilized to achieve the exposure of sample to adsorbent, the subsequently adsorbed sample should be freed of solvent prior to saturation with halogen vapor.

The following example is shown to illustrate the effective operation of the improved method described herein as applied to TLC techniques. The example traces the complete stepwise development performed on samples of alcohols in the C–16 to C–20 range utilizing silica gel as the absorbent.

The basic method was a stepwise development of a thin-layer plate. First, a relatively polar solvent was used, developing the plate approximately one-half the distance. This was followed by one or more developments with less polar solvents, allowing development for each solvent to proceed farther up the plate. Specifically three steps were used. These were:

1. development to an imaginary line 10 cm from the spot point in a mixture of n-hexane; diethyl ether: acetic acid (75:25:2, V/V/V).
2. development to an imaginary line 13 cm from one spot point in a solvent consisting of only n-hexane.
3. repeat of step (2) but over a total running distance of 16 cm.

The plate containing sample material was dried with a heat gun after Steps 1 and 2 and was then exposed to $I_2$ vapors for 20 minutes at $-30°C$. The first development succeeded in moving all components away from the spot point but did not resolve components, only groups of components; e.g., Group 1 (least polar): paraffins, olefins, aldehydes, and ethers; and Group 2: secondary, branched, and primary alcohols. Group 2 was resolved and not affected by subsequent developments in n-hexane. The second development (first n-hexane) resolved Group 1 components further into paraffins-olefins, aldehydes, and ethers with good resolution between the latter two. Exposure to $I_2$ vapors effectively immobilized the olefins from further movement in subsequent developments employing n-hexane and therefore allowed the paraffins to be separated away from the olefins during the third development (second n-hexane). Visualization was accomplished by charring with heat and $SO_3$ fumes. The charred zones were measured with a scanning photo densitometer, and the areas of resulting peaks were measured by planimetry.

In order to illustrate the effective operation of the present invention as applied to column chromatographic separation, the following example is presented. A sample mixture of heavy coker recycle (boiling range at atmospheric of 676°F to about 1,051°F; A.P.I. gravity 21.7; $C_{20}$ to about $C_{40}$) was employed for this work. Preliminary analysis via miniature thin layer chromatography (MTLC) using a stepwise development of the layer and iodine saturation indicated the sample mixture contained olefins as confirmed by standards and visual adsorption of iodine. Subsequent analyses on larger TLC plates found about 16 percent of the sample mixture as olefins.

In a batch operation, about 10 gms of TLC-grade silica gel, one ml of a hexane:chloroform solution containing about 3.0 mg/ml of sample and 10 mls of n-hexane were slurried together in a 2.0-ounce bottle. The n-hexane was removed by evaporation and 1 to 2 granules of iodine were placed in the bottle and mixed well with the gel. After about 2.0 hours, the contents of the bottle were placed in a small column (−5 mm in a diameter and 12 cm in length) and eluted first with −40 ml of n-hexane and then with −20 ml of acidic 9:1 chloroform-methanol.

The n-hexane fraction was evaporated to dryness, the iodine allowed to sublime and then redissolved in one ml of n-hexane:chloroform, which was the original volume of the sample used. MTLC, performed as above described, showed that the hexane fraction contained paraffins and aromatics but no olefins. No recovery of the olefin fraction from the column was made.

In comparison, the hexane fraction from a conventional column chromatographic separation performed on the same sample mixture yielded paraffins and olefins upon subsequently being analyzed by the TLC-$I_2$ technique.

The present invention was found to be applicable to all isomeric forms and a wide molecular weight range of alkenes so long as the absorbent was not overloaded and all solvent was removed from the absorbed mixture before halogen vapor exposure.

Having thus described the invention, we claim:

1. In a method for separating saturated from unsaturated compounds present in a mixture via adsorbing said mixture on an adsorbent selected from the group consisting of silica gel, alumina, and fluorosil and eluting with a solvent for the subsequent quantitative analysis thereof, wherein the improvement comprises, saturating said adsorbed mixture with halogen vapor.

2. The improvement of claim 1 wherein said vapor is iodine.

3. The improvement of claim 1 wherein said vapor is bromine.

4. The improvement of claim 1 wherein a polar solvent is employed prior to saturation of said adsorbed mixture with halogen vapor and subsequent thereto a nonpolar solvent is employed.

5. The improvement of claim 4 wherein said nonpolar solvent is hexane.

6. The improvement of claim 4 wherein prior to saturation of said adsorbed mixture with halogen vapor said mixture is freed of solvent.

7. The improvement of claim 1 wherein alkenes are separated from alkanes.

8. The improvement of claim 1 wherein said mixture of saturated and unsaturated compounds contain bonds selected from the group consisting of $C=C$, $C=O$, and $O-H$.

* * * * *